United States Patent
Sun et al.

(10) Patent No.: US 9,151,675 B2
(45) Date of Patent: Oct. 6, 2015

(54) DUAL-SWITCHING SENSING DEVICE, AND DUAL-FUNCTION SWITCHING CIRCUIT THEREOF

(71) Applicant: National Chi Nan University, Puli, Nantou (TW)

(72) Inventors: Tai-Ping Sun, Jhongli (TW); Yi-Chuan Lu, Lieyu Township, Kinmen County (TW); Hung-Wei Mao, Nantou (TW); Yao-Syun Wang, Nantou (TW)

(73) Assignee: NATIONAL CHI NAN UNIVERSITY, Puli, Nantou (TW)

( * ) Notice: Subject to any disclaimer, the term of this patent is extended or adjusted under 35 U.S.C. 154(b) by 3 days.

(21) Appl. No.: 14/282,365

(22) Filed: May 20, 2014

(65) Prior Publication Data

US 2015/0153231 A1 Jun. 4, 2015

(30) Foreign Application Priority Data

Dec. 2, 2013 (TW) .............................. 102144028 A (51) Int. Cl.
*G01J 5/02* (2006.01)
*G01J 5/10* (2006.01)
*H04N 5/335* (2011.01)

(52) U.S. Cl.
CPC ..... *G01J 5/02* (2013.01); *G01J 5/10* (2013.01); *H04N 5/335* (2013.01)

(58) Field of Classification Search
CPC ................ G01J 5/02; G01J 5/10; H04N 5/335
USPC ........................................................... 250/349
See application file for complete search history.

(56) References Cited

U.S. PATENT DOCUMENTS

| | | | | |
|---|---|---|---|---|
| 5,523,570 | A | * | 6/1996 | Hairston ........................ 250/349 |
| 5,751,005 | A | * | 5/1998 | Wyles et al. ............. 250/370.06 |
| 2012/0280129 | A1 | * | 11/2012 | Sun et al. .................... 250/338.4 |
| 2014/0197878 | A1 | * | 7/2014 | Sun et al. ...................... 327/434 |

* cited by examiner

*Primary Examiner* — David J Makiya
*Assistant Examiner* — Taeho Jo
(74) *Attorney, Agent, or Firm* — Merchant & Gould P.C.

(57) ABSTRACT

A dual-switching sensing device includes two sensor modules and a dual-function switching circuit with an operational amplifier and two integrator modules. Each of the integrator modules includes a transistor, an integrator capacitor and a switching unit. Through control of the switching unit, each of the integrator modules may operate in different modes, so that the dual-switching sensing device may be used to sense different targets.

12 Claims, 8 Drawing Sheets

DUAL-SWITCHING SENSING DEVICE, AND DUAL-FUNCTION SWITCHING CIRCUIT THEREOF

CROSS-REFERENCE TO RELATED APPLICATION

This application claims priority to Taiwanese Application No. 102144028, filed on Dec. 2, 2013.

BACKGROUND OF THE INVENTION

1. Field of the Invention

The invention relates to a dual-switching sensing device and a dual-function switching circuit.

2. Description of the Related Art

Under the atmosphere, different infrared radiation signals are distributed on surfaces of objects. The infrared radiation signals may classified into short-wave infrared (SWIR) having a wavelength ranging between 1 μm to 3 μm, mid-wave infrared (MWIR) having a wavelength ranging between 3 μm to 5 μm, and long-wave infrared having a wavelength ranging between 6 μm to 15 μm.

Although sensing techniques for SWIR may be matured, sensible waveband of the conventional SWIR sensing device is fixed, and is unable to be adjusted according to an ambient temperature and geographical changes, resulting in issues of low sensing precision or undetected sensing target.

SUMMARY OF THE INVENTION

Therefore, an object of the present invention is to provide a dual-switching sensing device that is capable of two detecting functions.

According to one aspect of the present invention, a dual-switching sensing device comprises:

two sensor modules, each of which is configured to sense a respective target, and to generate a sensor current corresponding to the target sensed thereby; and a dual-function switching circuit including:

an operational amplifier having a first input, two second inputs, and two outputs; and two integrator modules, each of which is coupled to a respective one of the sensor modules for receiving a corresponding sensor current therefrom, is configured to convert the sensor current into an integrator voltage associated with a magnitude of the sensor current, and includes:

a transistor having a first terminal coupled to the respective one of the sensor modules for receiving the sensor current therefrom, a second terminal, and a control terminal;

an integrator capacitor having a first terminal coupled to the second terminal of the transistor, and a second terminal; and a switching unit to be coupled to a ground node, having an output terminal for providing the integrator voltage, and coupled to a respective one of the second inputs of the operational amplifier, a respective one of the outputs of the operational amplifier, the transistor and the integrator capacitor.

The switching unit is operable to:

electrically couple one of the first terminal and the second terminal of the transistor to the respective one of the second inputs of the operational amplifier;

electrically couple the control terminal of the transistor to one of the ground node and the respective one of the outputs of the operational amplifier;

electrically couple the second terminal of the integrator capacitor to one of the ground node and the respective one of the outputs of the operational amplifier; and electrically couple the output terminal thereof to one of the first terminal and the second terminal of the integrator capacitor.

Another object of the present invention is to provide a dual-function switching circuit.

According to another aspect of the present invention, a dual-function switching circuit has the configuration of the dual-function switching circuit of the dual-switching sensing device of this invention.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
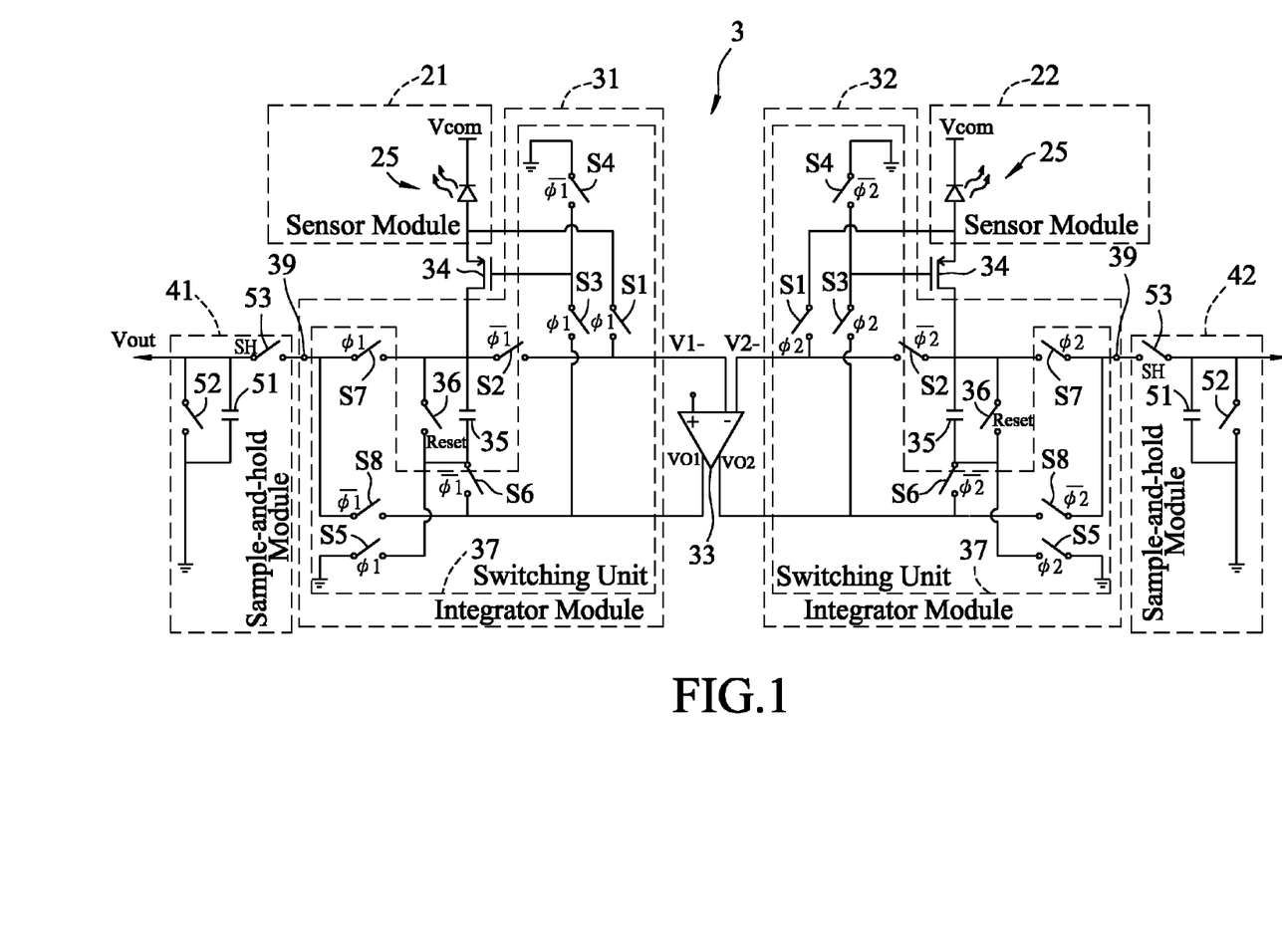
FIG. 1 is a schematic circuit diagram of a first preferred embodiment of the dual-switching sensing device according to the present invention.

Referring to FIG. 1, the first preferred embodiment of the dual-switching sensing device according to this invention is shown to include two sensor modules 21, 22 and a dual-function switching circuit 3.

Each of the sensor modules 21, 22 senses a respective target, generates a sensor current corresponding to the target sensed thereby, and includes a photosensor unit 25 that generates the sensor current according to a waveband of sensed light in this embodiment. In this embodiment, the photosensor unit 25 is a photodiode having a cathode receiving a common voltage Vcom, and an anode.

The dual-function switching circuit 3 includes an operational amplifier 33, two integrator modules 31, 32 and two sample-and-hold modules 41, 42.

Figure 2:
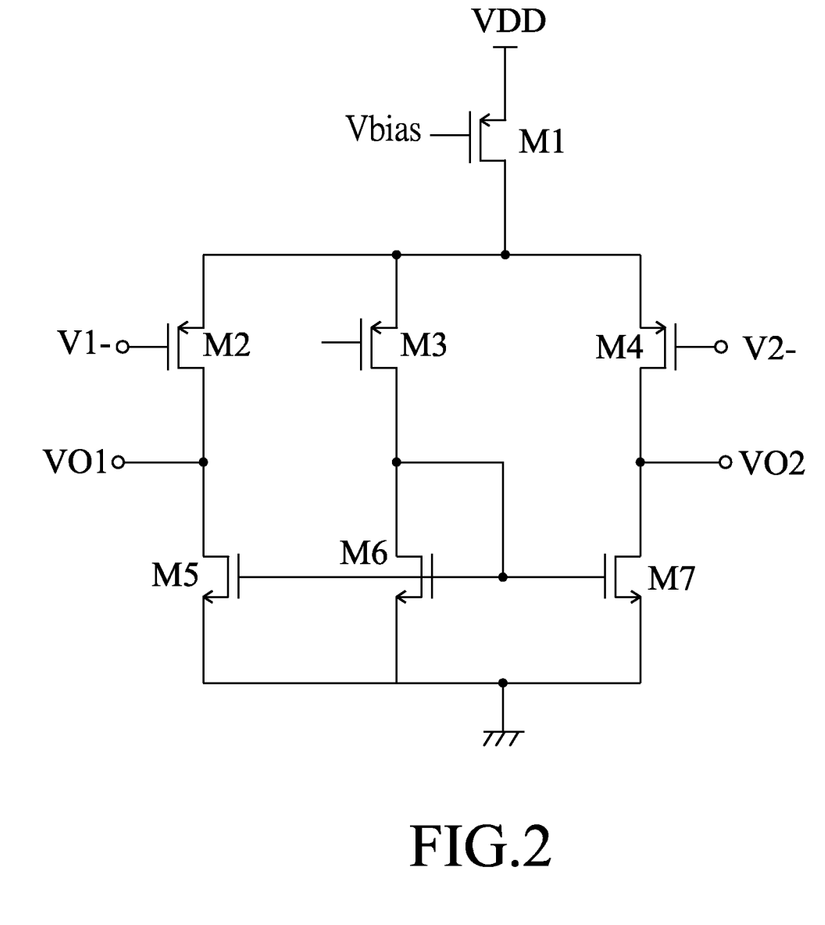
FIG. 2 is a schematic circuit diagram of an operational amplifier of the first preferred embodiment.

The operational amplifier 33 has a first input (+) (non-inverting input), two second inputs V1−, V2− (inverting inputs), and two outputs VO1, VO2. Referring to FIG. 2, the operational amplifier 33 includes first to seventh transistors M1 to M7.

The first transistor M1 has a first terminal receiving a first voltage VDD, a second terminal, and a control terminal receiving a bias voltage Vbias.

Each of the second, third and fourth transistor M2, M3, M4 has a first terminal coupled to the second terminal of the first transistor M1, a second terminal, and a control terminal. The control terminals of the second and fourth transistors M2, M4 respectively serve as the second inputs V1−, V2− of the operational amplifier 33. The control terminal of the third transistor M3 serves as the first input (+) of the operational amplifier 33.

Each of the fifth, sixth and seventh transistors M5, M6, M7 has a first terminal coupled to the second terminal of a respective one of the second, third and fourth transistors M2, M3, M4, a grounded second terminal, and a control terminal coupled to the second terminal of the third transistor M3. The first terminals of the fifth and seventh transistors M5, M7 respectively serve as the outputs VO1, VO2 of the operational amplifier 33.

Each of the integrator modules 31, 32 is coupled to a respective one of the sensor modules 21, 22 for receiving a corresponding sensor current therefrom, converts the sensor current into an integrator voltage associated with a magnitude of the sensor current, and includes an output terminal 39 for providing the integrator voltage, a transistor 34, an integrator capacitor 35, an integrator reset switch 36 and a switching unit 37.

The transistor 34 has a first terminal coupled to the corresponding sensor module 21/22 for receiving the sensor current therefrom, a second terminal, and a control terminal. The integrator capacitor 35 has a first terminal coupled to the second terminal of the transistor 34, and a second terminal, and converts the sensed current that flows through the transistor 34 into the integrator voltage.

The integrator reset switch 36 is coupled to the integrator capacitor 35 in parallel, and is operable to make electrical connection to clear electrical charges stored in the integrator capacitor 35.

The switching unit 37 is coupled to a ground node, and is coupled to a respective one of the second inputs V1−, V2− of the operational amplifier 33, a respective one of the outputs VO1, VO2 of the operational amplifier 33, the transistor 34 and the integrator capacitor 35. The switching unit 37 is operable to electrically couple one of the first and second terminals of the transistor 34 to the corresponding second input V1−/V2− of the operational amplifier 33, electrically couple the control terminal of the transistor 34 to one of the ground node and the corresponding output VO1/VO2 of the operational amplifier 33, electrically couple the second terminal of the integrator capacitor 35 to one of the ground node and the corresponding output VO1/VO2 of the operational amplifier 33, and electrically couple the output terminal 39 of the corresponding integrator module 31/32 to one of the first and second terminals of the integrator capacitor 35. The switching unit 37 includes first to eighth switches S1 to S8 in this embodiment.

The first switch S1 makes or breaks electrical connection between the first terminal of the transistor 34 of the corresponding integrator module 31/32 and the corresponding second input V1−/V2− of the operational amplifier 33.

The second switch S2 makes or breaks electrical connection between the second terminal of the transistor 34 of the corresponding integrator module 31/32 and the corresponding second input V1−/V2− of the operational amplifier 33.

The third switch S3 makes or breaks electrical connection between the control terminal of the transistor 34 of the corresponding integrator module 31/32 and the corresponding output VO1/VO2 of the operational amplifier 33.

The fourth switch S4 makes or breaks electrical connection between the control terminal of the transistor 34 of the corresponding integrator module 31/32 and the ground node.

The fifth switch S5 makes or breaks electrical connection between the second terminal of the integrator capacitor 35 of the corresponding integrator module 31/32 and the ground node.

The sixth switch S6 makes or breaks electrical connection between the second terminal of the integrator capacitor 35 of the corresponding integrator module 31/32 and the corresponding output VO1/VO2 of the operational amplifier 33.

The seventh switch S7 makes or breaks electrical connection between the first terminal of the integrator capacitor 35 of the corresponding integrator module 31/32 and the output terminal 39 of the corresponding integrator module 31/32.

The eighth switch S8 makes or breaks electrical connection between the corresponding output VO1/VO2 of the operational amplifier 33 and the output terminal 39 of the corresponding integrator module 31/32.

Each of the integrator modules 31, 32 is configured to operate in one of a capacitive transimpedance amplifier (CTIA) mode in which the switches S1, S3, S5, S7 thereof break electrical connections and the switches S2, S4, S6, S8 thereof make electrical connections, and a buffer direct injection (BDI) mode in which the switches S1, S3, S5, S7 thereof make electrical connections and the switches S2, S4, S6, S8 thereof break electrical connections. The CTIA mode is suitable for sensing MWIR light or SWIR light, and the BDI mode is suitable for sensing MWIR light or LWIR light.

Each of the sample-and-hold modules 41, 42 is coupled to a respective one of the integrator modules 31, 32 for receiving the integrator voltage therefrom, and is operable to sample and hold the integrator voltage received thereby for providing an output voltage Vout proportional to the integrator voltage.

Each of the sample-and-hold modules 41, 42 includes a readout switch 53, a sampling capacitor 51 and a sampling reset switch 52.

The readout switch 53 has a first terminal coupled to the output terminal 39 of the corresponding integrator module 31/32, and a second terminal.

The sampling capacitor 51 is coupled between the ground node and the second terminal of the readout switch 53.

The sampling reset switch 52 is coupled to the sampling capacitor 51 in parallel, and is operable to make electrical connection to clear electrical charges stored in the sampling capacitor 51.

Figure 3:
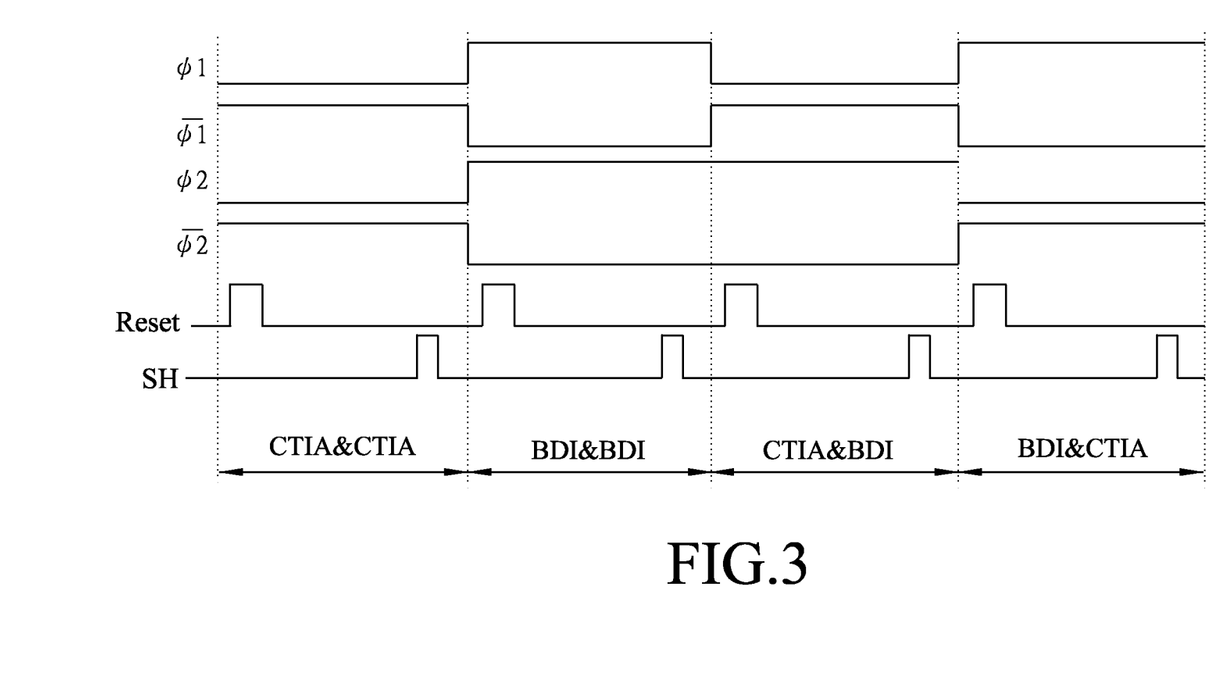
FIG. 3 is a timing diagram illustrating operation of the first preferred embodiment.

FIG. 3 is a timing diagram that illustrates switching of the integrator modules 31, 32 between the CTIA mode and the BDI mode. The switches S1, S3, S5, S7 of the integrator module 31 are controlled using a signal Φ1. The switches S2, S4, S6, S8 of the integrator module 31 are controlled using a signal $\overline{\Phi 1}$. The switches S1, S3, S5, S7 of the integrator module 32 are controlled using a signal Φ2. The switches S2, S4, S6, S8 of the integrator module 32 are controlled using a signal $\overline{\Phi 2}$. The integrator reset switches 36 of the integrator modules 31, 32 are controlled using a signal Reset. The readout switches 53 of the sample-and-hold modules 41, 42 are controlled using a signal SH.

Figure 4:
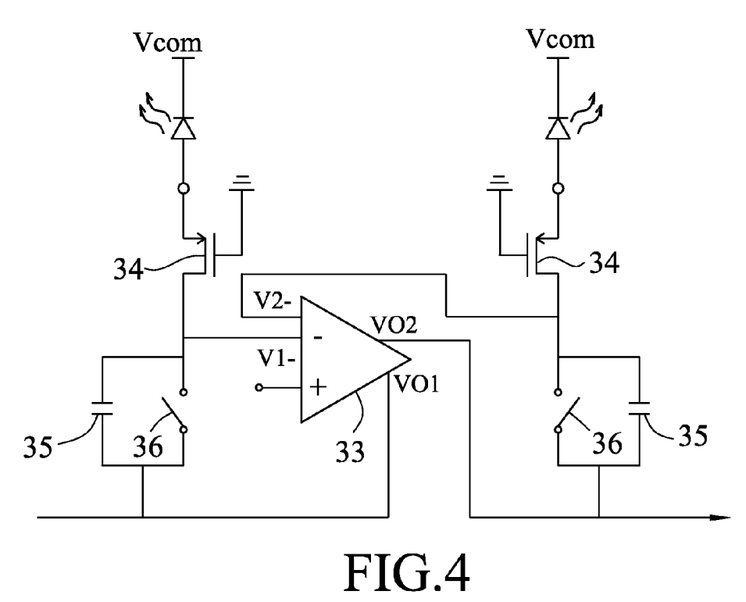
FIG. 4 is a schematic circuit diagram of the first preferred embodiment with two integrator modules operating in a capacitive transimpedance amplifier (CTIA) mode.

FIG. 4 is a schematic circuit diagram illustrating the integrator modules 31, 32 both operating in the CTIA mode. Since the common voltage Vcom received by the cathode of the photodiode is constant, the integrator voltage is negatively correlated with the magnitude of the sensor current as indicated in the following equation (1):

$$Vint = Vcom - \frac{1}{Cint}\int_0^t I(t)\,dt \quad (1)$$

where Vint is the integrator voltage, I is the magnitude of the sensor current, Cint is a capacitance of the integrator capacitor, and t is integration time.

Figure 5:
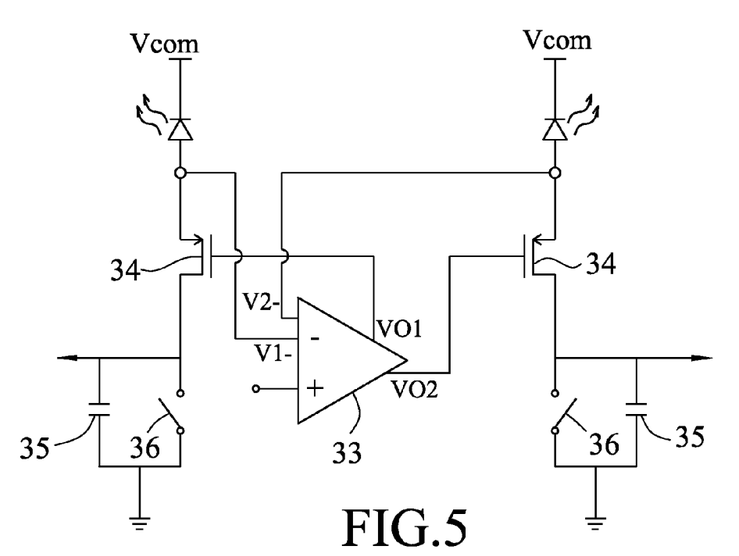
FIG. 5 is a schematic circuit diagram of the first preferred embodiment with two integrator modules operating in a buffer direct injection (BDI) mode.

FIG. 5 is a schematic circuit diagram illustrating the integrator modules 31, 32 both operating in the BDI mode. At this time, an input impedance of each of the integrator modules 31, 32 is lowered by (1+A) times to promote injection effect of the sensor current, where A is a gain of the operational amplifier 33. In the BDI mode, the integrator voltage is proportional to the magnitude of the sensor current as indicated in the following equation (2):

$$Vint = \frac{1}{Cint}\int_0^t I(t)\,dt \quad (2)$$

Figure 6:
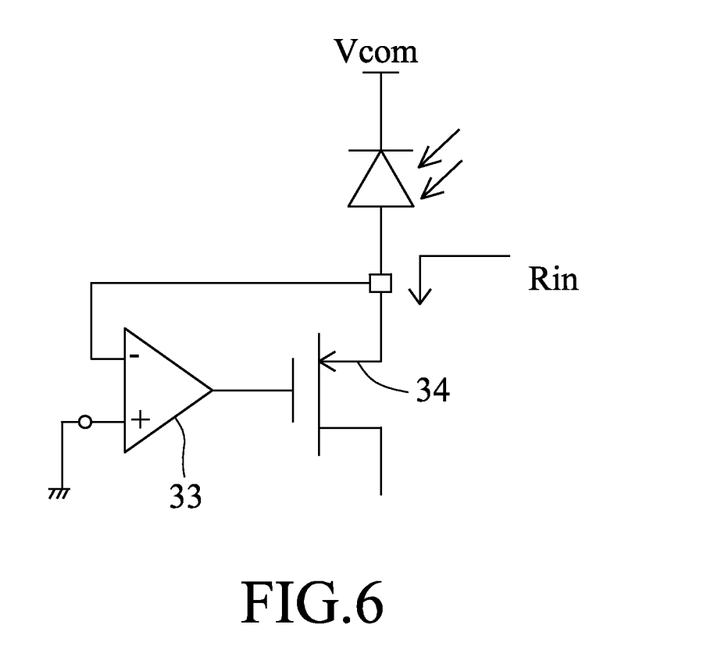
FIG. 6 is a schematic circuit diagram illustrating an input impedance of the integrator module of the first preferred embodiment.

Referring to FIG. 6, in order to facilitate analysis of the input impedance of the integrator modules 31, 32 operating in the BDI mode, the first input (i.e., the non-inverting input) of the operational amplifier 33 is assumed to be grounded and the source terminal of the transistor 34 receives a voltage V. Then, the input impedance may be computed as follows:

$$\frac{V-(-A\times V)}{I} = \frac{1}{gm} \rightarrow \frac{V}{I} = \frac{1}{(1+A)gm} = Rin \quad (3)$$

where I is a magnitude of a current injected into the source terminal of the transistor 34, A is the gain of the operational amplifier 33, and gm is a transconductance of the transistor 34.

Figure 7:
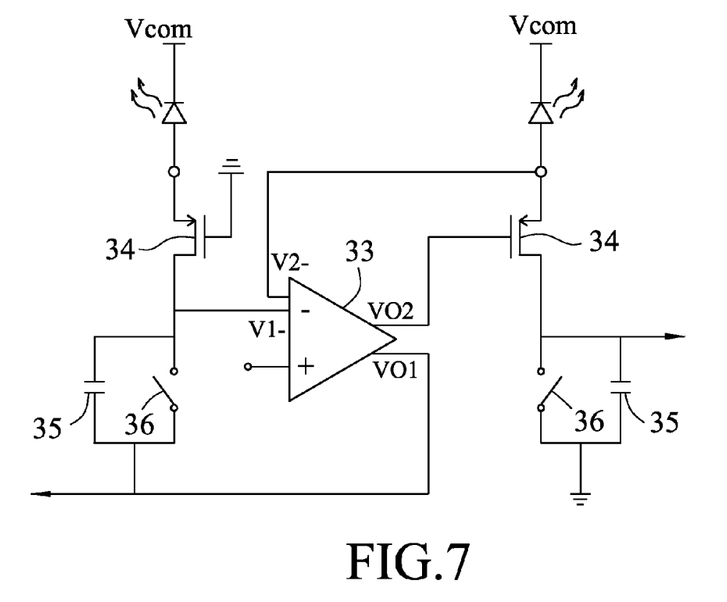
FIGS. 7 and 8 are schematic circuit diagrams of the first preferred embodiment with one integrator module operating in the CTIA mode and the other integrator module operating in the BDI mode.
Figure 8:
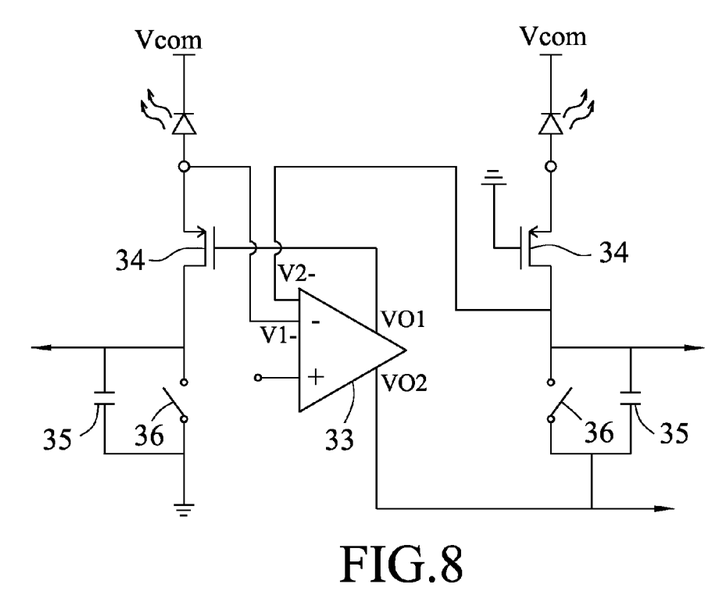

FIG. 7 is a schematic circuit diagram illustrating the integrator module 31 operating in the CTIA mode and the integrator module 32 operating in the BDI mode, and FIG. 8 is a schematic circuit diagram illustrating the integrator module 31 operating in the BDI mode and the integrator module 32 operating in the CTIA mode.

Figure 9:
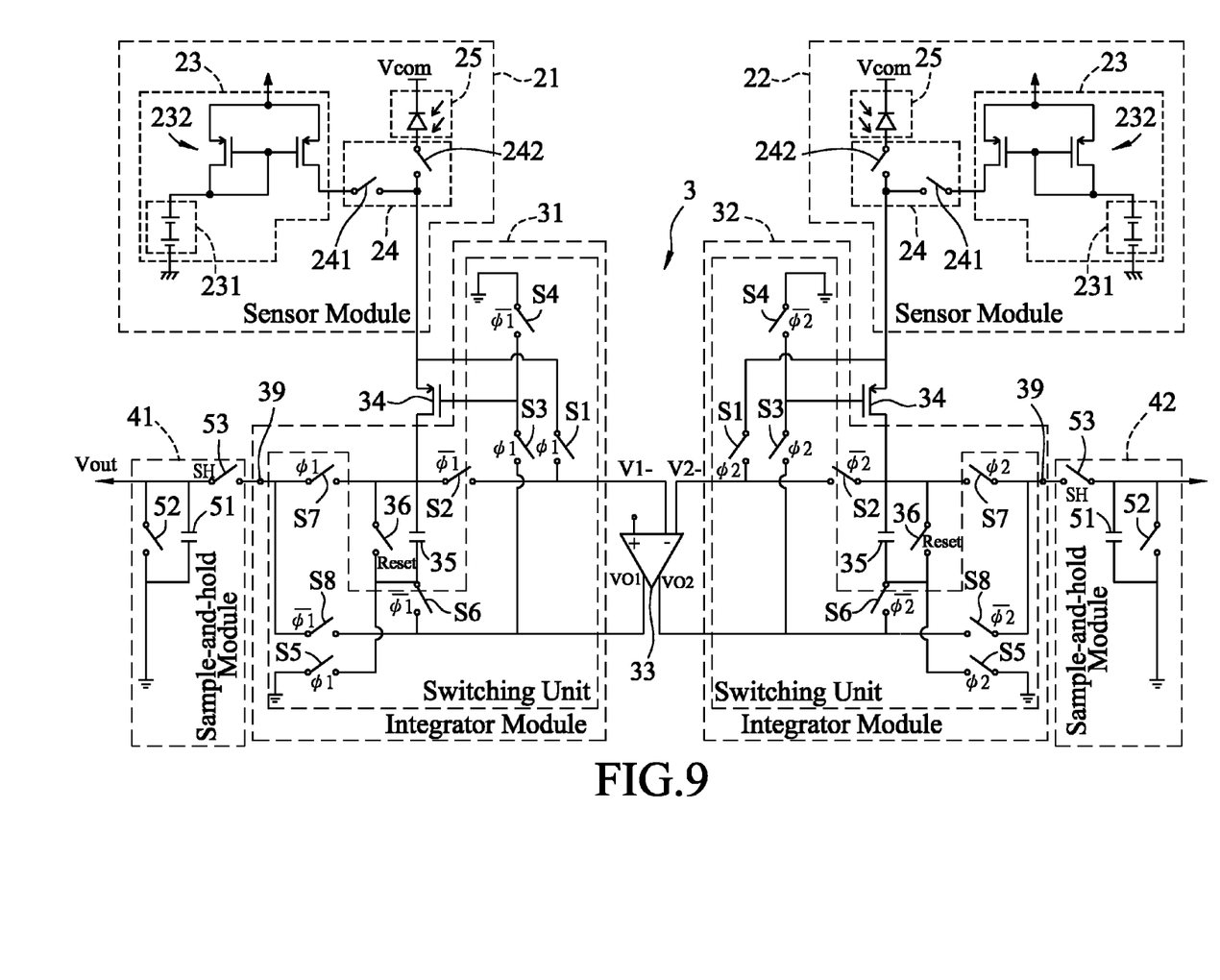
FIG. 9 is a schematic circuit diagram of a second preferred embodiment of the dual-switching sensing device according to the present invention.

Referring to FIG. 9, the second preferred embodiment of the dual-switching sensing device according to the present invention differs from the first preferred embodiment in that each of the sensor modules 21, 22 includes a biosensor unit 23, a photosensor unit 25 and a function selector 24. The dual-function switching circuit 3 of the second preferred embodiment has the same configuration as that of the first preferred embodiment.

The biosensor unit 23 converts a biological signal into a first current, and includes an electrochemical biosensor 231 and a current mirror 232.

The electrochemical biosensor 231 senses an ion concentration, and generates a working voltage.

The current mirror 232 is coupled to the electrochemical biosensor 231 for receiving the working voltage, and converts the working voltage into the first current.

The photosensor unit 25 senses a light, and generates a second current according to a waveband of the light sensed thereby. In detail, the photosensor unit 25 includes a photodiode that has a cathode receiving a common voltage Vcom, and an anode for providing the second current.

The function selector 24 is coupled to the biosensor unit 23, the photosensor unit 25 and the corresponding integrator module 31/32, and is operable to select one of the first current and the second current to serve as the sensor current that is provided to the corresponding integrator module 31/32.

Each function selector 24 includes a first function switch 241 and a second function switch 242.

The first function switch 241 has a first terminal coupled to the current mirror 232 of the corresponding sensor module 21/22 for receiving the first current, and a second terminal coupled to the first terminal of the transistor 34 of the corresponding integrator module 31/32, and makes or breaks electrical connection between the first and second terminals thereof.

The second function switch 242 makes or breaks electrical connection between the anode of the photodiode of the corresponding sensor module 21/22 and the first terminal of the transistor 34 of the corresponding integrator module 31/32.

Each of the sensor modules 21, 22 is configured to operate in one of a biosensor mode in which the first function switch 241 makes electrical connection and the second function switch 242 breaks electrical connection, and a photosensor mode in which the first function switch 241 breaks electrical connection and the second function switch 242 makes electrical connection.

Figure 10:
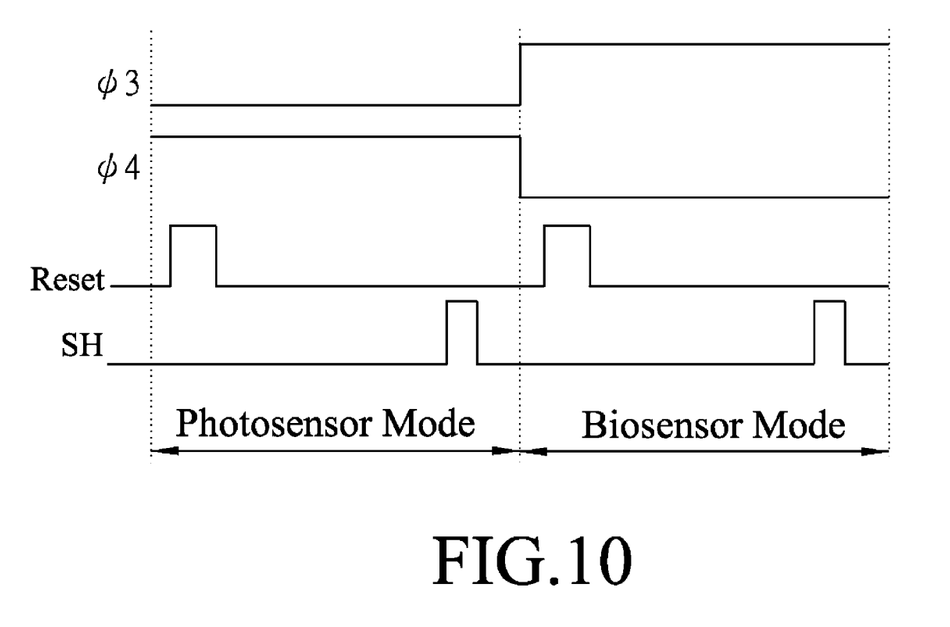
FIG. 10 is a timing diagram illustrating operation of the second preferred embodiment.

FIG. 10 is a timing diagram that illustrates switching of the sensor modules 21, 22 between the biosensor mode and the photosensor mode. The first function switch 241 is controlled using a signal Φ3, and the second function switch 242 is controlled using a signal Φ4.

To sum up, the preferred embodiments are advantageous in that:

1. Both of the first and second preferred embodiments are switchable between the CTIA mode and the BDI mode for sensing lights of different waveband, so that the sensible waveband is adjustable to fit the ambient temperature and geographical changes.

2. The second preferred embodiment is switchable between the biosensor mode and the photosensor mode, thereby achieving broader application.

3. By sharing the operational amplifier 33, circuit area may be saved while achieving switching between the CTIA mode and the BDI mode.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A dual-switching sensing device comprising:
   two sensor modules, each of which is configured to sense a respective target, and to generate a sensor current corresponding to the target sensed thereby; and
   a dual-function switching circuit including:
      an operational amplifier having a first input, two second inputs, and two outputs; and
      two integrator modules, each of which is coupled to a respective one of said sensor modules for receiving a corresponding sensor current therefrom, is configured to convert the sensor current into an integrator voltage associated with a magnitude of the sensor current, and includes:

an output terminal for providing the integrator voltage;

a transistor having a first terminal coupled to the respective one of said sensor modules for receiving the sensor current therefrom, a second terminal, and a control terminal;

an integrator capacitor having a first terminal coupled to said second terminal of said transistor, and a second terminal; and a switching unit to be coupled to a ground node, and coupled to said output terminal, a respective one of said second inputs of said operational amplifier, a respective one of said outputs of said operational amplifier, said transistor and said integrator capacitor, wherein:

said switching unit is operable to electrically couple one of said first terminal and said second terminal of said transistor to the respective one of said second inputs of said operational amplifier;

electrically couple said control terminal of said transistor to one of the ground node and the respective one of said outputs of said operational amplifier;

electrically couple said second terminal of said integrator capacitor to one of the ground node and the respective one of said outputs of said operational amplifier; and electrically couple said output terminal to one of said first terminal and said second terminal of said integrator capacitor.

2. The dual-switching sensing device as claimed in claim 1, further comprising two sample-and-hold modules, each of which is coupled to a respective one of said integrator modules for receiving the integrator voltage therefrom, and is operable to sample and hold the integrator voltage received thereby for providing an output voltage proportional to the integrator voltage.

3. The dual-switching sensing device as claimed in claim 2, wherein each of said sample-and-hold modules includes:

a readout switch having a first terminal coupled to said output terminal of the respective one of said integrator modules, and a second terminal;

a sampling capacitor coupled between the ground node and said second terminal of said readout switch; and a sampling reset switch coupled to said sampling capacitor in parallel, and operable to make electrical connection to clear electrical charges stored in said sampling capacitor.

4. The dual-switching sensing device as claimed in claim 1, wherein each of said sensor modules includes a photodiode having a cathode disposed to receive a common voltage, and an anode coupled to said first terminal of said transistor of the corresponding one of said integrator modules.

5. The dual-switching sensing device as claimed in claim 1, wherein each of said integrator modules further includes an integrator reset switch coupled to said integrator capacitor in parallel, and operable to make electrical connection to clear electrical charges stored in said integrator capacitor.

6. The dual-switching sensing device as claimed in claim 1, wherein said operational amplifier includes:

a first transistor having a first terminal disposed to receive a first voltage, a second terminal, and a control terminal disposed to receive a bias voltage;

a second transistor, a third transistor and a fourth transistor, each of which has a first terminal coupled to said second terminal of said first transistor, a second terminal, and a control terminal, said control terminal of each of said second transistor and said fourth transistor serving as a respective one of said second inputs of said operational amplifier, said control terminal of said third transistor serving as said first input of said operational amplifier; and a fifth transistor, a sixth transistor and a seventh transistor, each of which has a first terminal coupled to said second terminal of a respective one of said second transistor, said third transistor and said fourth transistor, a grounded second terminal, and a control terminal coupled to said second terminal of said third transistor, said first terminal of each of said fifth transistor and said seventh transistor serving as a respective one of said outputs of said operational amplifier.

7. The dual-switching sensing device as claimed in claim 1, wherein said switching unit of each of said integrator modules includes:

a first switch operable to make or break electrical connection between said first terminal of said transistor of the corresponding one of said integrator modules and the respective one of said second inputs of said operational amplifier;

a second switch operable to make or break electrical connection between said second terminal of said transistor of the corresponding one of said integrator modules and the respective one of said second inputs of said operational amplifier;

a third switch operable to make or break electrical connection between said control terminal of said transistor of the corresponding one of said integrator modules and the respective one of said outputs of said operational amplifier;

a fourth switch operable to make or break electrical connection between said control terminal of said transistor of the corresponding one of said integrator modules and the ground node;

a fifth switch operable to make or break electrical connection between said second terminal of said integrator capacitor of the corresponding one of said integrator modules and the ground node;

a sixth switch operable to make or break electrical connection between said second terminal of said integrator capacitor of the corresponding one of said integrator modules and the respective one of said outputs of said operational amplifier;

a seventh switch operable to make or break electrical connection between said first terminal of said integrator capacitor of the corresponding one of said integrator modules and said output terminal of the corresponding one of said integrator modules; and an eighth switch operable to make or break electrical connection between the respective one of said outputs of said operational amplifier and said output terminal of the corresponding one of said integrator modules;

wherein each of said integrator modules is configured to operate in one of a capacitive transimpedance amplifier (CTIA) mode in which said first switch, said third switch, said fifth switch and said seventh switch thereof break electrical connections and said second switch, said fourth switch, said sixth switch, said eighth switch thereof make electrical connections, and a buffer direct injection (BDI) mode in which said first switch, said third switch, said fifth switch and said seventh switch thereof make electrical connections and said second switch, said fourth switch, said sixth switch, said eighth switch thereof break electrical connections.

8. The dual-switching sensing device as claimed in claim 1, wherein each of said sensor modules includes:
- a biosensor unit configured to convert a biological signal into a first current;
- a photosensor unit configured to sense a light, and to generate a second current; and
- a function selector coupled to said biosensor unit, said photosensor unit and the respective one of said integrator modules, and operable to select one of the first current and the second current to serve as the sensor current that is provided to the respective one of said integrator modules.

9. The dual-switching sensing device as claimed in claim 8, wherein said photosensor unit of each of said sensor modules includes a photodiode having a cathode disposed to receive a common voltage, and an anode for providing the second current; and
said biosensor unit of each of said sensor modules includes:
- an electrochemical biosensor configured to sense an ion concentration, and to generate a working voltage; and
- a current mirror coupled to said electrochemical biosensor for receiving the working voltage, and to convert the working voltage into the first current.

10. The dual-switching sensing device as claimed in claim 9, wherein said function selector of each of said sensor modules includes:
- a first function switch having a first terminal coupled to said current mirror of the corresponding one of said sensor modules for receiving the first current, and a second terminal coupled to said first terminal of said transistor of the respective one of said integrator modules, and operable to make or break electrical connection between said first terminal and said second terminal thereof; and
- a second function switch operable to make or break electrical connection between said anode of said photodiode of the corresponding one of said sensor modules and said first terminal of said transistor of the respective one of said integrator modules;
wherein each of said sensor modules is configured to operate in one of a biosensor mode in which said first function switch makes electrical connection and said second function switch breaks electrical connection, and a photosensor mode in which said first function switch breaks electrical connection and said second function switch makes electrical connection.

11. A dual-function switching circuit comprising:
an operational amplifier having a first input, two second inputs, and two outputs; and
two integrator modules, each of which is disposed to receive a sensor current, is configured to convert the sensor current into an integrator voltage associated with a magnitude of the sensor current, and includes:
- an output terminal for providing the integrator voltage;
- a transistor having a first terminal disposed to receive the sensor current, a second terminal, and a control terminal;
- an integrator capacitor having a first terminal coupled to said second terminal of said transistor, and a second terminal; and
- a switching unit to be coupled to a ground node, and coupled to said output terminal, a respective one of said second inputs of said operational amplifier, a respective one of said outputs of said operational amplifier, said transistor and said integrator capacitor, wherein:
    said switching unit is operable to
      electrically couple one of said first terminal and said second terminal of said transistor to the respective one of said second inputs of said operational amplifier;
      electrically couple said control terminal of said transistor to one of the ground node and the respective one of said outputs of said operational amplifier;
      electrically couple said second terminal of said integrator capacitor to one of the ground node and the respective one of said outputs of said operational amplifier; and
      electrically couple said output terminal thereof to one of said first terminal and said second terminal of said integrator capacitor.

12. The dual-function switching circuit as claimed in claim 11, further comprising two sample-and-hold modules, each of which is coupled to a respective one of said integrator modules for receiving the integrator voltage therefrom, and is operable to sample and hold the integrator voltage received thereby for providing an output voltage proportional to the integrator voltage.

\* \* \* \* \*